United States Patent Office 3,356,707
Patented Dec. 5, 1967

3,356,707
BORON ESTERS AND PROCESS OF
PREPARING SAME
James B. Hinkamp, Birmingham, and John D. Bartleson, Franklin, Mich., and Glenn E. Irish, Fullerton, Calif., assignors to Ethyl Corporation, New York, N.Y., a corporation of Virginia
No Drawing. Filed May 5, 1958, Ser. No. 732,819
7 Claims. (Cl. 260—462)

This application is a continuation-in-part of application, Ser. No. 579,127, filed Apr. 19, 1956, and now abandoned; and a continuation-in-part of application, Ser. No. 605,485, filed Aug. 22, 1956, now U.S. 3,014,061, issued Dec. 19, 1961.

This invention relates to new compositions of matter and in particular to new esters of boron acids. It also relates to use of such new compounds as additives to lubricating oil and other hydrocarbon media.

Various boron compounds have been proposed as fuel or oil additives. These have suffered from one or more of the following disadvantages: their effectiveness was slight; they were unstable under use conditions, especially with reference to hydrolysis; they were limited in utility to only one or a few types of hydrocarbons; they were difficult and/or uneconomical to prepare, etc. The petroleum industry would greatly benefit by provision of boron compounds which are highly effective in improving a wide range of hydrocarbon types and which are stable under use conditions.

An object of this invention is to provide new compositions of matter. A further object is to provide stable boron-containing reaction products. Another object is to provide new compositions of matter which have high effectiveness in improving the characteristics of liquid hydrocarbons. Still another object is to provide new processes for preparing these boron-containing reaction products. An additional object is to provide new compositions of matter which comprise liquid hydrocarbons, particularly mineral oils, containing the boron compounds of this invention. Other objects of this invention will be apparent from the ensuing description.

In accordance with the present invention we provide new compounds which are esters of boron acids with 2,6-dialkyl phenols wherein the alkyl groups are branched on the $\alpha$-carbon atom and contain at least 4, preferably 4 to 10, carbon atoms. Our invention comprises any such esters containing at least one such phenol residue. In other words, we contemplate esters of boron acids at least one of whose acidic hydrogens is esterified by a phenol residue of the type described. The other acidic hydrogens may be esterified by additional phenolic residues or by different esterifying radicals such as simple alkyl, aryl or glycol groups.

This invention also comprises compositions which consist of liquid hydrocarbons containing esters of boron acids with 2,6-dialkyl phenols wherein the alkyl groups are branched on the $\alpha$-carbon atom and contain at least 4, preferably 4 to 10, carbon atoms. A specific embodiment of this aspect comprises mineral lubricating oil containing such compounds.

The present class of new boron esters is remarkable in that it possesses a high degree of hydrolytic stability. Most previously known boron esters have been readily subject to hydrolysis to the extent that when in contact with water for a very short period of time the ester is completely destroyed. This unfortunate instability detracts from the effectiveness of such compounds as additives to liquid hydrocarbons for the purpose of imparting oxidative stability, etc. Not only are the present compounds hydrolytically stable but they also possess a high degree of antioxidant activity.

At first glance it might be supposed that the hydrolytic stability of the present compounds is due to the hindrance provided by the branched alkyl groups in the positions ortho to the phenolic hydroxyl. However, it is not as simple as this because, as will be seen later, certain compounds wherein only one of the boron valences is esterified with such a phenol and the others are esterified with simple alkyl or glycol groupings, possess great hydrolytic stability. Indeed, it sometimes appears to be more marked in such compounds than in the completely phenolic materials.

In general, the esters of this invention can be prepared from or derived from any acid of boron, including orthoboric acid ($H_3BO_3$), metaboric acid ($HBO_2$), pyroboric acid ($H_4B_2O_5$), (sometimes referred to as mesoboric acid), the various polyboric acids, boronic acid ($H_3BO_2$), borinic acid ($H_3BO$), etc. Suitable esters of this invention can also be prepared by esterifying the sulfur analogs of the above boron acids.

Any phenol which has alkyl groups of 4 to 10 carbon atoms in the two positions ortho to the hydroxyl group can be used to prepare the esters of this invention as long as the two alkyl groups are branched on the alpha carbon atoms. The preferred phenols are those which have no groups on the ring, other than the hydroxyl group, capable of reacting with the boron acid. Preferred phenols are, therefore, those having on the 3, 4 and 5 carbon atoms of the ring groups selected from the class consisting of hydrogen, alkyl groups, aryl hydrocarbon groups, ether groups, ester groups and halogen atoms.

Thus, the present invention comprises a group of esters including triaryl orthoborates such as tri(2,6-di-tert-butylphenyl)orthoborate and tri(2,6-di-tert-amylphenyl)orthoborate; diaryl monoalkyl orthoborates such as di(2,6-di-tert-amylphenyl)monoethyl orthoborate; and monoaryl dialkyl orthoborates such as mono(2,6-di-tert-butylphenyl)dibutyl orthoborate and mono(2,6-di-tert-butylphenyl)ethylene glycol orthoborate.

This invention also comprises metaborates, both the completely arylated type and mixed metaborates containing some phenolic groups and some aliphatic and/or glycol groups. Examples are tri(2,6-di-tert-butylphenyl)-trimeric metaborate and tri(2,6-di-tert-heptylphenyl)trimeric metaborate. Likewise, the present new class of compounds includes corresponding esters of pyroboric acid such as tetra(2,6 - di - tert - decylphenyl)pyroborate and tetra(2,6-di-tert-heptylphenyl)pyroborate as well as esters of the other boron acids mentioned above, such as di(2,6-di - tert - butylphenyl)propylboronate, (2,6 - di-tert-butylphenyl)propylamylborinate, (2,6 - di-tert-octylphenyl)diphenylborinate, and the like.

Included within the scope of this invention are 2,6-di-tert-alkyl phenyl glycol orthoborates, 4,4'-methylenebis-(2,6-di-tert-alkyl phenyl) dialkyl orthoborates, 4,4'-methylenebis(2,6-di-tert-alkyl phenyl)glycol orthoborates, 2,6-di-tert-alkyl phenyl dialkyl orthoborates, 2,6-di-tert-alkyl phenyl metaborates and di(2,6-di-tert-alkyl phenyl)alkyl orthoborates. In all cases the tertiary alkyl groups are of the type described, namely, alkyl groups of 4 to 10 carbon atoms with branching on the carbon atom alpha to the benzene nucleus. The 4,4'-methylenebis compounds are also sometimes known as biborates.

Further examples of our new esters include methylenebis(2,6-di-tert-butyl-p-phenylene) bis(1,1,3 - trimethyltrimethylene) diborate, di-n-butyl - 2,6 - di-tert-butyl-p-tolyl borate, 2,6-di-tert-butyl-p-tolyl trimeric metaborate, 2,6-di-tert-p-tolyl-1,1,3-trimethyltrimethylene borate, 2,6-di-tert-butylphenyl diisobutyl borate, di-sec-butyl-2,6-di-tert-butylphenyl borate, 2,6-di-tert-butylphenyl diisopropyl borate, 2,6-di-tert-butylphenyl bis(2,6-diisopropylphenyl) borate, bis(2,6-di-tert-butyl-p-tolyl)-n-propyl borate, bis-(2,6-di-tert-butyl-p-tolyl)isopropyl borate, 2,6 - di - tert-butylphenyl di-n-propyl borate, 2,6-di-tert-butyl-p-tolyl di-n-propyl borate, 2,6-di-tert-butyl-p-tolyl diisopropyl borate, bis(2,6-di-tert-butyl-p-tolyl)isopropyl borate, di-n-butyl 2,4,6-tri-tert-butylphenyl borate, bis(2-n-butoxyethyl) (2,6-di-tert-butylphenyl)borate and 2,6-di-tert-butylphenyl di-n-octyl borate.

From the point of view of effectiveness, ease of preparation, availability, economics, etc. the preferred esters are mono(2,6-di-tert-alkylphenyl)glycol orthoborates; 4,4'-methylenebis(2,6-di-tert-alkylphenyl) dialkyl orthoborates and 4,4' - methylenebis(2,6 - di-tert-alkylphenyl) glycol orthoborates.

Our new compounds can be prepared by a variety of methods. One of the principal methods, direct esterification, comprises reacting the corresponding boron acid with the phenol with which the acid is to be esterified. This is commonly done at elevated temperature to facilitate removal of water and thus drive the reaction to completion. Use of a hydrocarbon diluent capable of forming an azeotrope with the water of esterification is useful in our processes. The esterification reactions are therefore usually conducted at temperatures of 75 to about 150° C. in the presence of such hydrocarbons as benzene, toluene, xylene and the like. The reaction rate can be increased by the use of conventional esterification catalysts, usually strong acids such as sulfuric acid, aromatic sulfonic acids and the like.

Another mode of preparation of the new esters of this invention comprises transesterification or ester interchange between a simple boron acid ester such as an alkyl ester and a phenol corresponding to the substituted phenyl radical of the desired ester. This mode of preparation is especially applicable to the esters which contain, in addition to substituted phenyl radicals, simple alkyl or glycol esterifying residues. For example, reaction of 2,6-di-tert-butylphenol with isopropyl butylene glycol orthoborate leads to a good yield of 2,6-di-tert-butylphenyl butylene glycol orthoborate.

In this variation a good procedure consists of heating a simple ester of a boron acid with the phenol corresponding to the desired substituted phenyl group until transesterification is achieved. This process is suitably conducted in the presence of an inert hydrocarbon such as those mentioned above.

In accordance with the above, orthoborates can be prepared according to the following examples.

*Example I*

2,6-di-tert-butylphenol (247 parts) was reacted with 76 parts of tri-n-butyl orthoborate by heating the two materials together for 24 hours at 228–267° C. The product, (2,6-di-tert-butylphenyl)di-n-butyl orthoborate, was isolated in 53 percent yield by distillation from the reaction mixture. This product boils at 126–127° C./0.4 mm. The boron content by analysis was 2.90 percent (theoretical 2.99 percent).

*Example II*

2,6-di-tert-butylphenol (68 parts) and 115 parts of tri-n-butyl orthoborate were reacted by heating the materials together 34 hours at 214–250° C. The product, (2,6-di-tert-butylphenyl)di-n-butyl orthoborate, was isolated in 65 percent yield by the procedure of Example I. The boron analysis was 2.95 percent.

*Example III*

To 62 parts of orthoboric acid is added 618 parts of 2,6-di-tert-butylphenol in xylene solution and the mixture is heated at 140° C. for 24 hours. The tri(2,6-di-tert-butylphenyl) orthoborate which is formed is separated from the reaction mixture by crystallization in good yield.

*Example IV*

Twenty-one parts of orthoboric acid and 39 parts of 2-methyl-2,4-pentanediol were refluxed in 175 parts of xylene until 15 parts of water was removed. This took about 12 hours. To the resulting mixture was added 17 parts of acetic anhydride and this solution was refluxed for 4 hours during which time it turned deep red. Finally 71 parts of methylenebis(2,6-di-tert-butylphenol) were added to the solution and it was further refluxed for 5 hours. Distillate was taken off intermittently until no more acid came over. In this manner, 4,4'-methylenebis[2,6-di-tert-butylphenyl(hexyleneglycol)borate] was prepared.

*Example V*

A mixture of 72 parts of methylenebis(2,6-di-tert-butylphenol) and 89 parts of bis(1,1,3-trimethyltrimethylene)pyroborate was heated for 48 hours at 190° C. A stream of nitrogen was swept over the reaction mixture to help remove water of reaction by entrainment. The product of Example IV was obtained in 60.3 percent yield as a white crystalline solid melting at 167.5–169° C. This material had a boron content by analysis of 3.30 percent and a molecular weight of 674.4. The calculated values are 3.20 and 676.58, respectively.

*Example VI*

Thirty-one parts of isopropyl(2-methyl-2,4-pentylene)-orthoborate and 35 parts of 2,6-di-tert-butylphenol were stirred and heated in the absence of a solvent. The temperature of the reaction mixture was raised to 180° C. and 200 milliliters of xylene was added and the reaction mixture heated to reflux. After 22 hours the reaction mixture was filtered and distilled at 14 mm. through a short Vigreux column to remove most of the impurities. The product itself, 2,6-di-tert-butylphenyl(2-methyl-2,4-pentylene)-orthoborate, was distilled at 165–180° C. at 9 mm. to give a pale yellow, viscous liquid, $n^{24.5}$ D 1.4849. The boron content of this product was found to be 3.48 percent (theory is 3.26 percent B). The yield was 38 percent.

*Example VII*

Two hundred eighty-three parts of 4,4'-methylenebis-(2,6-di-tert-butylphenol) was reacted with 307 parts of tri-n-butyl orthoborate at 210–288° C. for 30 hours. No solvent was used. At the end of the 30-hour period, 90 percent of the theoretical amount of n-butyl alcohol had been removed. The product, tetra-n-butyl methylenebis-(2,6-di-tert-butyl-p-phenylene) diborate had a boron content by analysis of 3.06 percent. The theoretical boron content is 2.94 percent.

*Example VIII*

When the procedure of Example I is repeated at a temperature over 300° C. the principal product is di(2,6-di-tert-butylphenyl)-n-butyl orthoborate.

The metaborate esters can be prepared by reacting metaboric acid with the appropriate phenol or mixture of phenols. Metaboric acid, in turn, can readily be prepared by heating orthoboric acid in the presence of an azeotroping agent such as toluene to remove water of dehydration.

*Example IX*

Metaboric acid was prepared by heating orthoboric acid to a temperature of 110° C. in the presence of toluene. The toluene forms an azeotrope with the water of dehydration and this azeotrope was removed by means of a water trap. To the residual metaboric acid was then added 2,6-di-tert-butylphenol in the ratio of one mole for every mole of metaboric acid calculated as HOBO. This reaction mixture was then heated at 110° C. for 24 hours in the presence of sulfuric acid (0.06 percent of the weight of the total reaction mixture) and p-toluene sulfonic acid (0.1 percent of the weight of the total reaction mixture) as catalysts. At the end of this time the reaction mixture was cooled at room temperature and the product, tri(2,6-di-tert-butylphenyl)trimeric metaborate was obtained as a light brown crystalline solid. Recrystallization of this product from toluene yields a white crystalline solid.

Example X 2,6-di-tert-butylphenol (52 parts) was reacted with 22 parts of isopropyl metaborate in 260 parts of toluene. The reaction was conducted at 110° C. and was complete, on the basis of isopropanol eliminated, within 32 hours. Isopropyl bis(2,6-di-tert-butylphenyl)metaborate was isolated in 41 percent yield as a white crystalline solid.

*Analysis.*—Calcd. for $C_{27}H_{49}O_6B_3$: B, 5.90; mol. wt., 550. Found: B, 5.85; mol. wt., 580.

The boronate esters of this invention can be prepared by reacting boron trihalide with Grignard reagent to form the acid dihalide of boronic acid, hydrolyzing this to the corresponding acid, and then reacting this acid with the appropriate 2,6-dialkyl phenol or mixtures of 2,6-dialkyl phenols. Preparation of the borinate esters of this invention is analogous.

Example XI

Butyl-dichloro boronate is prepared by reaction of one mole of boron trichloride with one mole of butyl magnesium chloride in diethyl ether solution. Upon completion of the reaction two moles of water are added to hydrolyze the product to butyl boronic acid. To this reaction mixture is added 2-tert-butyl-6-tert-amyl phenol in benzene solution in the proportion of 2 moles of the phenol for every mole of the boron compound. After heating to 75° C. for 18 hours, di(2-tert-butyl-6-tert-amylphenyl)butyl boronate is formed in good yield.

Example XII

Dibutyl monochloro borinate is formed from 2 moles of ethyl magnesium bromide and 1 mole of boron tribromide in ether solution. This is hydrolyzed to the borinic acid by the procedure of Example V. To this reaction mixture is added 1 mole of 2,6-di-tert-butyl phenol in toluene solution and the resulting mixture is heated to 120° C. for 24 hours. The 2,6-di-tert-butylphenyl dibutyl borinate which is obtained in good yield is separated from the reaction mixture by crystallization.

The pyroborate esters of this invention can be conveniently prepared by transesterifying alkyl pyroborates with 2,6-dialkyl phenols of the type described above. The alkyl pyroborates can be prepared by the method of U.S. Patent 2,721,121.

Example XIII

A tetraalkyl pyroborate containing higher alkyl groups and prepared according to the method of U.S. Patent 2,721,121 is reacted with 2,6-diamyl phenol in the ratio of 4 moles of the phenol to 1 mole of the pyroborate ester. The reaction is conducted in benzene solution at a temperature of 75° C. in the presence of a small amount of sulfuric acid with the transesterification catalyst. The product, tetra(2,6-diamylphenyl)pyroborate is obtained in good yield.

Another group of compounds within the present invention consists of boron-containing products obtained by reaction between a dinuclear phenolic compound having, in all positions ortho to a phenolic hydroxyl group, alkyl groups of 4 to 10 carbon atoms and branched on the alpha carbon atom and a completely esterified metaboric acid, each ester group of said esterified metaboric acid being discrete—i.e., attached to the molecule at one point only—and at least one of said groups being a monovalent, non-aromatic hydrocarbon ester group which contains no more than about 6 carbon atoms; there being from about 0.3 to about 3 moles of said compound per gram atom of boron as said completely esterified metaboric acid. These products are readily obtained by reacting the above phenols with the above esters at a temperature from about 60 to about 220° C.

These compounds are prepared by reacting (1) a dinuclear phenolic compound having, in all positions ortho to a phenolic hydroxyl group, alkyl groups of the type described, (2) a completely esterified metaboric acid, each ester group of said esterified metaboric acid being discrete and at least one of said groups being a monovalent, non-aromatic hydrocarbon ester group which contains no more than about 6 carbon atoms; there being used in this reaction from about 0.3 to about 3 moles of said compound per gram atom of boron as said completely esterified metaboric acid. This reaction readily takes place by bringing together the above reactants in the proportions specified and heating the resultant mixture to a temperature between about 60 and about 220° C. In this reaction there is liberated the alcohol from which the boron ester was at least in part prepared. It appears that this process results, at least in part, from an ester interchange between the dinuclear phenolic compound and the metaborate ester. Since the products are complex, it is likely that additional transformations occur. Completion of reaction is evidenced by cessation of evolution of the monohydric alcohol from which the boron ester had been at least in part prepared.

This variation can be conducted in the absence of a solvent, but it is preferable to employ an inert solvent to assist in the liberation of the alcohol. Such solvent should boil between 80 and 200° C. and preferably between 100 and 170° C. Suitable solvents for this purpose include aromatic hydrocarbons, such as benzene, toluene, xylene, pseudocumene; aromatic fractions boiling within the reaction temperature ranges above specified or the like; aliphatic hydrocarbons, such as n-octane, decanes, etc.; inert chlorinated hydrocarbons, such as carbon tetrachloride, chloroform, triclene, etc.; and the like.

Example XIV

To a solution of 28.5 parts of isopropyl metaborate trimer dissolved in 120 parts of toluene was added 106 parts of 1,1-bis(3,5-di-tert-butyl-4-hydroxyphenyl)methane dissolved in 160 parts of toluene. The resulting solution was heated to 113–115° C. with stirring. The isopropanol-toluene azeotrope was removed from the reaction system leaving the reaction product between the phenolic compound and isopropyl metaborate dissolved, for the most part, in the remaining toluene. This product was recovered by evaporating the toluene, extracting the residue with petroleum ether and evaporating the petroleum ether from the product. The product was a yellow granular solid melting at 120° C. It contained 1.1 percent of boron.

The hydrolytic stability of the new boron esters was demonstrated by the following tests: A large test tube containing 100 grams of lubricating oil, a sample of the boron ester adjusted to a boron concentration in the oil of 0.1 weight percent and 25 ml. of water was held at 65° C. for 4 hours, during which time air was bubbled through the mixture at 70 liters per hour. At the end of the four-hour period the oil layer was analyzed for residual boron content. The degree of retention of boron is a measure of the hydrolytic stability of the boron ester.

Typical results obtained with compounds of this invention expressed as percent of original boron content retained in the oil phase are as follows:

TABLE I

| Compound: | Boron content retained, percent |
|---|---|
| 2,6-di-tert-butylphenyl-di-n-butyl orthoborate | 100 |
| (2,6-di-tert-butyl-4-methylphenyl) - (2 - methyl-2,4-pentylene) orthoborate | 97 |
| 4,4'-methylenebis[2,6-di-tert - butylphenyl(hexylene glycol)borate] | 93 |
| 2,6 - di-tert-butyl - 4 - methylphenyl-di-n-butyl orthoborate | 87 |
| Reaction product of 4,4'-methylenebis(2,6 - di-tert-butylphenol) and isopropyl metaborate | 80 |
| (2,6-di-tert-butylphenyl)-(2-methyl-2,4 - pentylene) orthoborate | 76 |

In contrast, typical prior art boron esters had much lower hydrolytic stability as shown in Table II.

TABLE II

| Compound: | Boron content retained, percent |
|---|---|
| n-Octyl orthoborate | 7 |
| Orthocresol orthoborate | 9 |
| Methyl orthoborate | 0 |
| Phenyl orthoborate | <1 |

Among the liquid hydrocarbons which are improved in accordance with this invention are included hydrocarbon mixtures of the types which are normally used as fuels, as lubricating agents, and as intermediates for the preparation and production of the same. Benefits are therefore obtained by blending with gasoline, jet fuel, fuel oil, crude petroleum and the like, the boron-containing products of this invention. Pure hydrocarbons are also benefited by dissolving therein the new boron-containing products of this invention, particularly with regard to their combustion properties. Examples of such hydrocarbons include benzene, toluene, n-octane, isoheptane, and in general, pure aliphatic, cycloaliphatic, naphthenic and aromatic liquid hydrocarbons. In the hydrocarbons which are used as fuels, this invention imparts improved combustion properties thereto. In the case of the liquid hydrocarbons which are used as lubricating agents, this invention imparts improved thermal stability and oxidation resistance thereto. When used in the treatment of petroleum crudes and intermediate fractions, the boron-containing products of this invention impart easier processing characteristics thereto and, in addition, ordinarily result in improved characteristics of the finished petroleum products obtained therefrom.

The amount of boron additive used in accordance with this invention varies according to the type of liquid hydrocarbon medium to which it is added. In jet fuel the concentration of boron ester usually ranges between 0.008 to 5 weight percent, preferably 0.04 to 2.0 weight percent. In the heavier liquid hydrocarbons such as mineral lubricating oil, good results are obtained when the amount varies between 0.003 and 10 percent by weight. In gasoline the amount is usually chosen to provide from 0.01 to 1.5 grams of boron per gallon of liquid hydrocarbon, preferably 0.01 to 0.2 gram of boron per gallon.

Many of the esters of this invention, particularly those derived from metaboric acid and certain other boron acids, have the property of apparently reacting with certain impurities in the liquid hydrocarbons to cause removal of impurities by precipitation. It is not certain just what these impurities are although it is now known that the metaborates and certain other of the boron compounds of this invention react with nitrogen-containing compounds, peroxides and water to form precipitates. It appears there may be some connection between the formation of the precipitates and the extreme effectiveness of the additives. After removal of the precipitate the liquid hydrocarbon in many cases is found to possess the advantages described above and is also quite susceptible to enhancement by addition of further amounts of boron esters. The boron ester subsequently added may be any boron ester; not necessarily one of this invention.

*Example XV*

To 100,000 parts of gasoline consisting of 45.2 volume percent paraffins, 28.4 volume percent olefins and 25.4 volume percent aromatics and containing 3.0 ml. of tetraethyllead along with 1.0 theory of ethylene dichloride and 0.5 theory of ethylene dibromide (1 theory being the amount necessary to react completely with the lead to form lead dihalide) is added 250 parts of tri(2,6-di-tert-butylphenyl)trimeric metaborate. The resulting precipitate is removed by filtration leaving gasoline containing 0.01 gram per gallon of boron as 2,6-di-tert-butylphenyl metaborate. Substantially none of the gasoline is lost or wasted in the procedure. The resultant gasoline is found to have a lower surface ignition rate than previously and to be more stable toward decomposition by light.

*Example XVI*

A portion of the gasoline composition of Example XV, after removal of the precipitate, is washed with copious amounts of water until all the residual metaborate is removed. To this washed gasoline is added 1.5 grams per gallon of boron as methyl metaborate. It is found that this gasoline possesses enhanced combustion properties as compared with the same gasoline to which the same amount of methyl metaborate is added without the benefit of the pre-treatment by the compound of the present invention.

In this connection it is to be noted that the treatment with a compound of this gasoline enhances the response of the gasoline not only to further additions of compounds of this invention but to additions of other boron compounds as well.

*Example XVII*

To 100,000 parts of JP-5 jet fuel is added 300 parts of 2,6 - di-tert-butylphenyl - 1,1,3 - trimethyltrimethylene orthoborate. The resulting jet fuel composition possesses enhanced thermal stability and combustion properties.

*Example XVIII*

To 100,000 parts of phenol treated, mixed base hydrocarbon mineral oil having a viscosity of 53.4 Saybolt Universal Seconds at 210° F. and a viscosity index of 103 is added 1000 parts of 4,4'-methylenebis(2,6 - di-tert-butylphenyl)-1,1,3 - trimethyltrimethylene orthoborate. The resulting lubricating oil composition possesses enhanced thermal stability characteristics.

Similar results are obtained when the above and other hydrocarbons are treated or admixed with the other metaborates of this invention.

*Example XIX*

To 1000 parts of toluene is added 100 parts of tri(2-ethyl-6-tert-butylphenyl)orthoborate. The resulting mixture possesses enhanced combustion properties.

*Example XX*

To 100,000 parts of hydrocarbon diesel fuel having a cetane number of 51.7 and API gravity of 37.0, a heat content of 19,620 B.t.u. per pound and a 50 percent boiling point of 509° F. is added 1000 parts of tetra-(2,6-di-tert-butylphenyl)pyroborate. The resulting blend possesses superior combustion properties, particularly with regard to smoking tendencies.

*Example XXI*

To 50,000 parts of liquified petroleum gas consisting chiefly of propane and butane is added 500 parts of di(2,6-di-tert-amylphenyl)dodecyl boronate. The resulting blend possesses superior combustion properties.

Example XXII

To 100,000 parts of cracked unleaded gasoline is added 100 parts of 2,6-di-tert-butylphenyl diethylborinate. The resulting gasoline blend possesses superior combustion properties and superior susceptibility toward addition of tetraethyllead.

The effectiveness of the present compounds as lube oil antioxidants is shown by the Polyveriform test which is described in the paper entitled "Factor Causing Lubricating Oil Deterioration in Engines," Ind. and Eng. Chem., Anal. ed. 17, 302 (1945). See also "A Bearing Corrosion Test for Lubricating Oils and Its Correlation With Engine Performance," Anal. Chem., 21, 737 (1949). This test effectively evaluates the performance of petroleum hydrocarbon oil antioxidants. The test equipment and procedure employed and correlation of the results with engine performance are discussed in the first paper above cited.

In these tests the base oil used was an initially additive-free, 95 V.I. solvent-refined SAE petroleum hydrocarbon crankcase lubricating oil. Oxidative deterioration of the oil was promoted by employing as an oxidation catalyst 0.05 percent by weight of the ferric oxide (added as ferric 2-ethyl hexoate). It has been found by experiment that under the drastic conditions of elevated temperature and the presence in the oil of ferric oxide, mineral oils are very rapidly deteriorated, as measured by increase in acid number and viscosity increase.

In the present tests, the principal conditions consisted of passing 70 liters of air per hour through the oil for a total period of 20 hours while maintaining it at 300° F. In every group of tests one was carried out using the additive-free base oil and others using the same oil to which had been added boron containing products of the invention.

Typical results obtained with compounds of this invention are shown in Table III. All additives were present at a concentration equivalent to 0.05 weight percent boron.

TABLE III

| Additive | Acid No. | Viscosity Increase, percent |
|---|---|---|
| None | 5.3 | 120 |
| Di-n-butyl 2,6-di-tert-butylphenyl borate | 0.52 | 8 |
| None | 5.3 | 108 |
| 2,6-di-tert-butyl-p-tolyl metaborate trimer | 0.66 | 13 |
| 2,6-di-tert-butylphenyl metaborate trimer | 1.24 | 21 |
| 2,6-di-tert-butyl-p-tolyl 1,1,3-trimethyltrimethylene borate | 3.57 | 60 |
| 2,6-di-tert-butylphenyl diisopropyl borate | 3.0 | 49 |
| n-Butyl bis (2,6-di-tert-butylphenyl borate) | 0.8 | 12 |
| Bis(2,6-di-tert-butyl-p-tolyl) isopropyl borate | 3.4 | 44 |
| n-Butyl bis (2,6-di-tert-butyl-p-tolyl) borate | 3.8 | 55 |
| 2,6-di-tert-butylphenyl di-n-propyl borate | 2.1 | 36 |
| 2,6-di-tert-butyl-p-tolyl di-n-propyl borate | 1.0 | 12.5 |
| 2,6-di-tert-butyl-p-tolyl diisopropyl borate | 1.7 | 22 |
| Bis(2,6-di-tert-butylphenyl) isopropyl borate | 1.3 | 9 |
| None | 5.4 | 103 |
| Methylenebis(2,6-di-tert-butyl-p-phenylene)bis-(1,1,3-trimethyltrimethylene) diborate | 0.88 | 10 |
| Di-n-butyl 2,6-di-tert-butyl-p-tolyl borate | <1 | <15 |

The effectiveness of the present compounds was also shown in the Panel Coker tests, whose procedure is as follows: A sample of a lubricating oil containing a boron ester of the type described is splashed against a heated aluminum panel which is maintained at a controlled temperature. The weight of deposit formed on the panel is a measure of the oxidation stability of the lubricant. For the tests involved the panel temperature was 550° F., the time of testing was 10 hours and the splasher was operated for 5 seconds each minute. Results are shown in Table IV.

TABLE IV

| Additive | Conc., Weight Percent Boron | Weight of Deposit, mg. |
|---|---|---|
| None | None | 434 |
| Methylenebis(2,6-di-tert-butyl-p-phenylene)bis-(1,1,3-trimethylmethylene)diborate | 0.05 | 48.3 |

The substantial improvements which result from addition of these agents to jet fuel is illustrated by tests in an apparatus known as the Erdco Fuel Coker. This unit and the method of using it are described in Petroleum Processing, December 1955, pp. 1909–11. The apparatus consists of a heated sintered steel filter through which a preheated fuel is passed at a regulated rate. Observations were made of the amount and nature of the deposit which is formed in the preheater tube. This is an important consideration in operation of jet aircraft as most jet fuels tend to decompose thermally at the high temperatures to which they are exposed in jet flight. This causes fouling of fuel systems, loss of heat transfer, etc. In the particular tests referred to here the cylinder and preheater were both operated at 500° F. and fuel was passed through the system at the rate of 6 pounds per hour for a total time of three hours. Without any additive the fuel left a deposit in the preheater which amounted to a 50 percent cover of the surface. Part of this deposit was tan and part was gun metal in color. However, when the same was run through the apparatus under identical conditions except that it contained 0.15 gram of boron per gallon as 4,4'-methylenebis(2,6-di-tert-butyl-p-phenylene) bis(1,1,3-trimethyltrimethylene) biborate the intensity of the deposit cover was markedly reduced to the point where it varied between a haze and a light haze. Under some circumstances the amount of cover was also substantially reduced.

The efficacy of the present compounds has also been demonstrated by actual engine operation as in the CFR test (ASTM D–357). In this procedure a Waukesha CFR engine with L-head cylinder having a displacement of 37.3 cubic inches and a compression ratio of 7.0 to 1 is operated under an alternating idle-full load cycle. The idle cycle which lasts for 50 seconds is conducted at 600 r.p.m. with no load. This is followed with 150 seconds of full-load operation at 900 r.p.m. The test is run for 40 hours, at the end of which time the oil in the crankcase is tested according to the Polyveriform procedure described above. Typical results are as follows:

TABLE V

| Additive | Conc. | Acid No. | Viscosity Increase, Percent |
|---|---|---|---|
| Methylenebis(2,6-di-tert-butyl-p-phenylene)bis(1,1,3-trimethyltrimethylene) diborate | 0.1 | 1.6 | 14 |
| Di-n-butyl 2,6-di-tert-butylphenyl borate | 0.05 | 4.3 | 65 |
| 2,6-di-tert-butyl-p-tolyl metaborate trimer | 0.1 | 3.4 | 45 |
| 2,6-di-tert-butylphenyl metaborate trimer | 0.1 | 4.6 | 71 |

The above CFR results are particularly unusual in that in some of the runs virtually all the boron had disappeared from the oil at the end of the test. In spite of this fact the boron in some way stabilized the oil.

Still further indication of the value of the present compounds is gotten by their performance in the CLR test engine. This engine and tests are described in the Coordinating Research Council booklet "Development of Research Technique for Study of the Oxidation Characteristics of Crankcase Oils in the CLR Oil Test Engine," revised March 1957. The tests were carried out for 40 hours at a speed of 3150 r.p.m. with a load of 5 brake horsepower. The air-fuel ratio was 14 to 1 and the spark advance 35° before top dead center. The crankcase oil temperature is maintained at 280° F. In the CLR procedure a sample of oil not containing an additive resulted in a copper-lead bearing weight loss of 300 to 500 mg. at the end of 40 hours run. When di-n-butyl 2,6-di-tert-butylphenyl borate was used in the same oil in a replicate test the weight loss after 40 hours was only 22 mg. and after 80 hours was only 24 mg. When the concentration of di-n-butyl 2,6-di-tert-butylphenyl borate was reduced to 0.05 weight percent boron the weight loss after 40 hours was 20 mg. and at half this concentration it was only 39.9 mg.

We claim:

1. A boron ester derived from boron acids selected from the group consisting of pyroboric, boronic, and borinic acids wherein an esterifying group is a 2,6-dialkyl phenol wherein the alkyl groups are branched on the α-carbon atom and contain at least 4 carbon atoms.

2. Compounds of the general formula

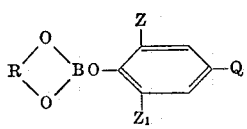

where R is selected from the class consisting of a polymethylene radical having from 2 to 4 carbon atoms in linear chain and a lower alkyl substituted polymethylene radical having from 2 to 4 carbon atoms in linear chain, Q is selected from the group consisting of hydrogen and alkyl, and Z and $Z_1$ are tertiary alkyl radicals.

3. A hydrolysis-resistant mixed ester of orthoboric acid with a hydroxy derivative of an alkane in which there are 1 to 2 hydroxy substituents, and with a bis(2,6-di-tert-alkylphenol) in which the two 2,6-di-tert-alkylphenol groups are bridged together by a methylene bridge connected para to each phenolic hydroxy substituent.

4. As a composition of matter a mono(2,6-di-tert-alkylphenyl) glycol orthoborate whose alkyl groups contain 4 to 10 carbon atoms and are branched on the alpha carbon atom.

5. As a composition of matter, a 4,4'-methylenebis(2,6-di-tert-alkylphenyl) dialkyl orthoborate whose alkyl groups contain 4 to 10 carbon atoms and are branched on the alpha carbon atom.

6. As a composition of matter a 4,4'-methylenebis(2,6-di-tert-alkylphenyl) glycol orthoborate whose alkyl groups contain 4 to 10 carbon atoms and are branched on the alpha carbon atom.

7. A process for preparing a compound of the general formula

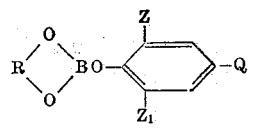

where R is selected from the class consisting of a polymethylene radical having from 2 to 4 carbon atoms in linear chain and a lower alkyl substituted polymethylene radical having from 2 to 4 carbon atoms in linear chain, Q is selected from the group consisting of hydrogen and alkyl, and Z and $Z_1$ are tertiary alkyl radicals, comprising reacting a glycol borate of the formula

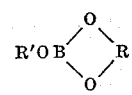

where R' is selected from the class consisting of hydrogen and an aliphatic group of 1 to 10 carbon atoms and where R is as defined earlier, with a phenol of the general formula

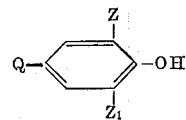

the symbols Q, Z and $Z_1$ being as defined earlier, whereby to produce said borate ester.

References Cited

UNITED STATES PATENTS

| | | | |
|---|---|---|---|
| 2,613,219 | 10/1952 | Clark | 260—462 |
| 2,642,453 | 6/1953 | Lippincott | 260—462 |
| 2,710,251 | 6/1955 | Darling | 44—76 |
| 2,721,121 | 10/1955 | Lawrence et al. | 44—76 |
| 2,721,181 | 10/1955 | Lawrence et al. | 252—49.6 |
| 2,795,548 | 6/1955 | Thomas et al. | 252—49.6 |

CHARLES B. PARKER, *Primary Examiner.*

R. L. CAMPBELL, WILLIAM WILES, L. D. ROSDOL,
*Examiners.*

R. J. FINNEGAN, L. A. SEBASTIAN,
*Assistant Examiners.*